United States Patent [19]
Duncan

[11] Patent Number: 5,175,738
[45] Date of Patent: Dec. 29, 1992

[54] INSULATOR FOR LASER HOUSING

[75] Inventor: David B. Duncan, Auburn, Calif.

[73] Assignee: The United States of America as represented by the United States Department of Energy, Washington, D.C.

[21] Appl. No.: 915,162

[22] Filed: Sep. 29, 1986

[51] Int. Cl.⁵ .............................................. G02B 5/08
[52] U.S. Cl. ........................................ 372/35; 372/56; 372/62
[58] Field of Search .............. 372/35, 56, 62, 92, 372/98, 34, 61; 445/28; 219/121; 330/4.3

[56] References Cited
U.S. PATENT DOCUMENTS

| | | | |
|---|---|---|---|
| 3,541,371 | 11/1970 | Legros et al. | 372/35 X |
| 3,628,172 | 12/1971 | Matovich et al. | 372/35 X |
| 3,696,308 | 10/1972 | Duffy et al. | 372/35 X |
| 3,713,043 | 1/1973 | Avivi et al. | 372/62 |
| 3,861,787 | 1/1975 | Locke et al. | 372/35 X |
| 3,875,531 | 4/1975 | Buczek et al. | 372/35 X |
| 4,255,720 | 3/1981 | Wang et al. | 372/56 X |

Primary Examiner—Mark Hellner
Attorney, Agent, or Firm—Miguel A. Valdes; Henry P. Sartorio; William R. Moser

[57] ABSTRACT

The present invention provides a heat-resistant electrical insulator adapted for joining laser housing portions, which insulator comprises: an annulus; a channel in the annulus traversing the circumference and length of the housing; at least two ports, each communicating with the channel and an outer surface of the housing; and an attachment for securely attaching each end of the annulus to a laser housing member.

5 Claims, 2 Drawing Sheets

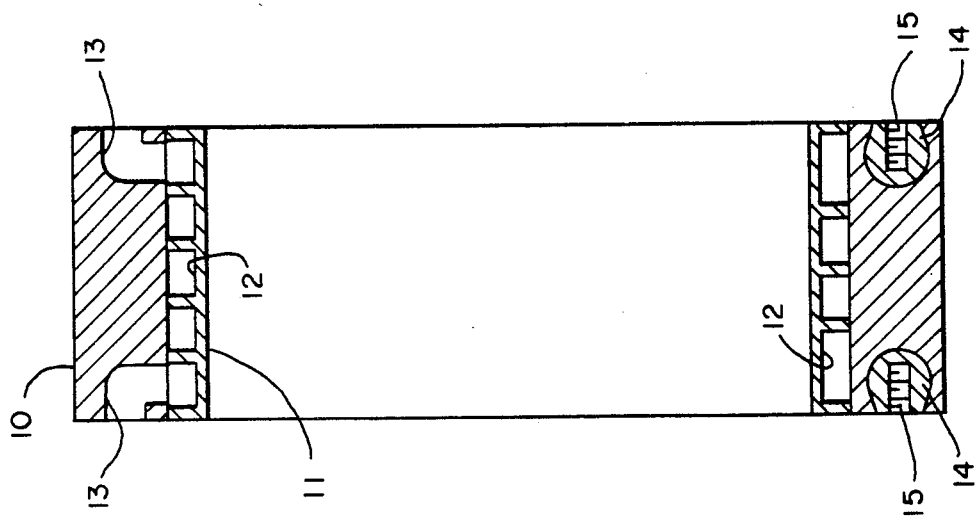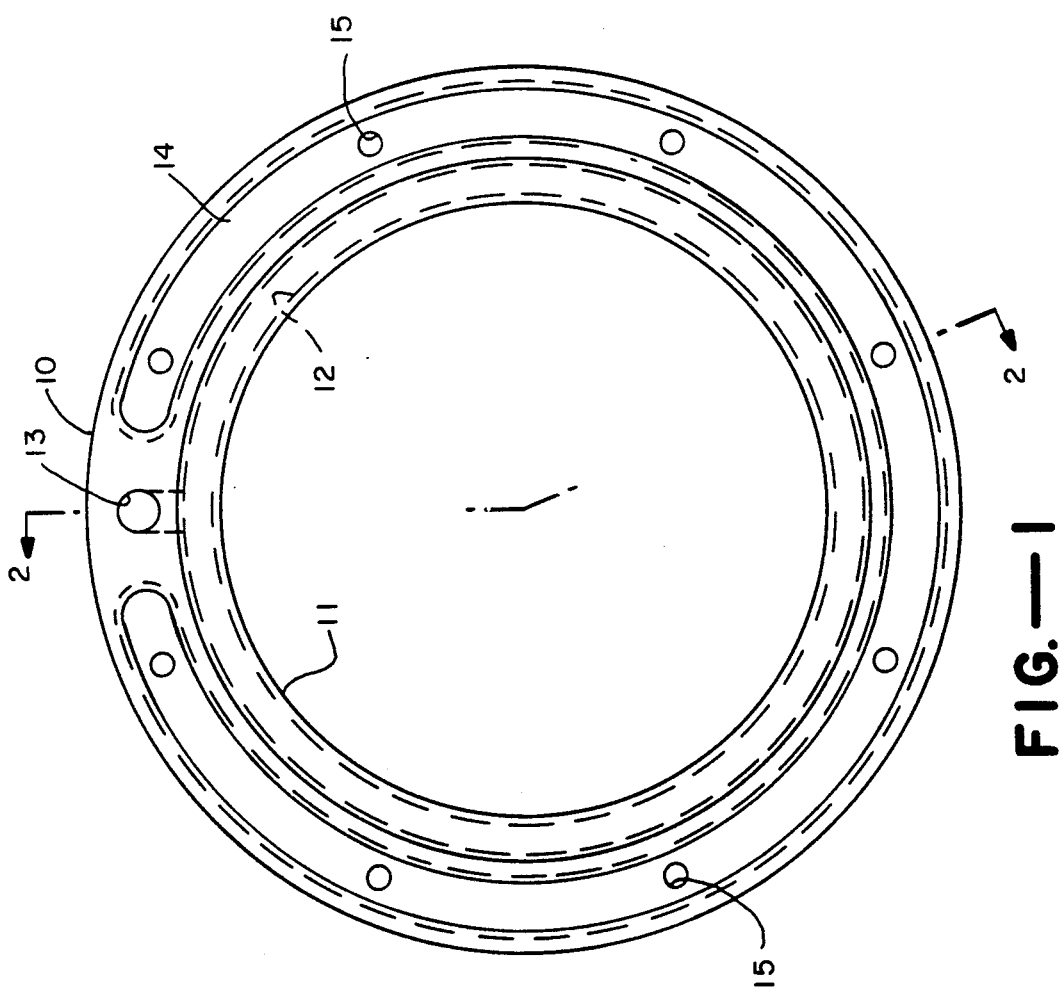

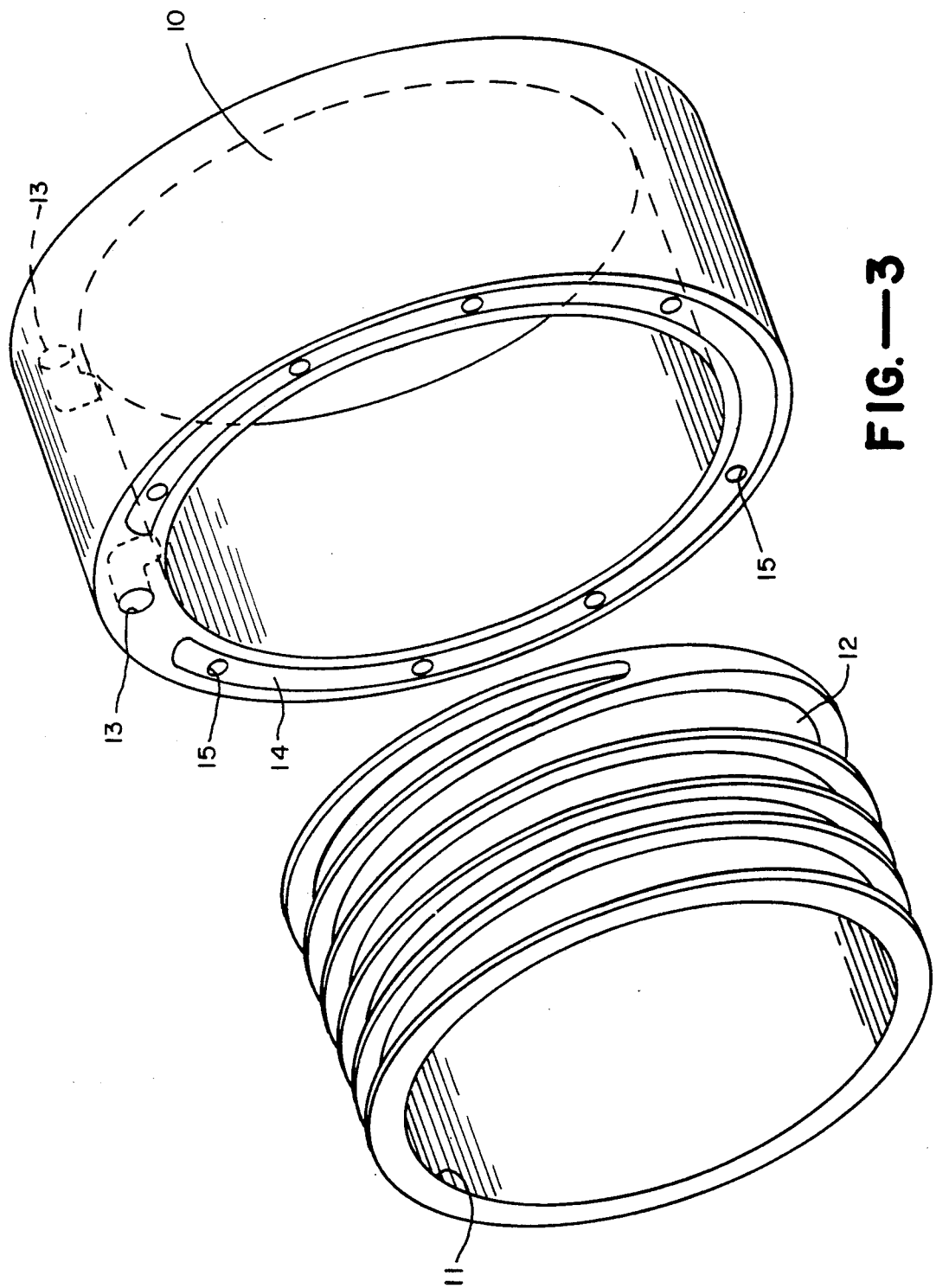

INSULATOR FOR LASER HOUSING

The United States Government has rights in this invention pursuant to Contract No. W-7405-ENG-48 between the United States Department of Energy and University of California for the operation of the Lawrence Livermore National Laboratory.

FIELD OF THE INVENTION

The present invention is directed to an insulator means for joining laser housing portions. In particular, the present invention is directed to an insulating annulus adapted for joining tubular laser housing members.

BACKGROUND OF THE INVENTION

The tubular portions of the housing of a laser generating assembly usually comprise two sections, electrically insulated from each other, each section being electrically biased due to their electrical contact with the respective electrodes in the laser. The insulator means, sometimes referred to as the break, which joins two sections of the laser housing not only must be an electrical insulator, but must also form a vacuum seal to each portion of the laser housing. A further requirement is that the break be sufficiently heat-resistant to withstand the temperatures generated by the laser. The breaks in copper vapor lasers (CVLs) have heretofore been formed of ceramic material, such as alumina. However, such ceramic breaks suffer from at least two important disadvantages which inhibit their adaptation to application to large bore lasers or to a laser installation of industrial scale. The first such disadvantage is that utilization of a ceramic break in a large bore laser, i.e., a laser having an inner diameter of about 10 inches or more, requires such large pieces of alumina that the manufacturing cost of the break alone begins to approach the cost of the total of the costs of the other components of the laser. Thus, in an industrial scale laser installation, where a plurality of lasers may be used in line and/or multiplexed, a significant portion of the installation will be the cost of the ceramic breaks. Secondly, in an installation accommodating a plurality of lasers within an enclosed edifice, the heat which radiates from the ceramic break from each laser is substantial. Since the interior of the edifice is necessarily airconditioned to protect other components required to generate and utilize laser beams, such as electrical components, another significant portion of the costs of operating a laser installation would be the cost of maintaining the proper temperature within the edifice housing the lasers. Therefore, it is evident that two rather substantial cost components of an industrial laser installation stem from a single item, the ceramic break.

SUMMARY OF THE INVENTION

It is an object of the present Invention to provide an insulator means for joining laser housing portions of a CVL which is advantageously cooled.

It is a further object of the present invention to provide an insulator means which is economically advantageous to manufacture, thermally stable and electrically insulating.

Briefly, the present invention provides heat-resistant electrical insulator means adapted for joining laser housing portions, which insulator means comprises: an annulus; a channel in the annulus traversing the circumference and length of the housing; at least two ports, each communicating with the channel and an outer surface of the housing; and attachment means for securely attaching each end of the annulus to a laser housing member.

Additional objects, advantages and novel features of the present invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate a preferred embodiment of the invention and, together with the description, serve to explain the principles of the invention.

FIG. 1 is a plan view of a preferred embodiment of the present invention.

FIG. 2 is a cross-sectional view taken along line 2—2 of FIG. 1.

FIG. 3 is an exploded perspective view of the preferred embodiment shown in FIG. 1.

DETAILED DESCRIPTION OF THE PREFERRED EMBODIMENTS

The general shape of the insulator means according to the present invention will depend upon the shape of the laser housing portions to which it will be attached. Generally laser housings are tubular in shape, and in such instances, the insulator means according to the present invention will be an annulus. It will be appreciated that the insulator means will also be finished on the two end faces of the annulus to form a tight seal with the respective surfaces of each laser housing to which the annulus will be attached. Furthermore, the insulator means will be provided with attachment means adapted for secure attachment to each laser housing portion. The means of attachment will depend upon the means available on the end of the laser housing, which is usually a series of circumferentially placed holes adapted for receiving bolts, screws or rivets. Appropriate gaskets, provided they will be heat-resistant to the temperatures of the laser, may be utilized between the insulator means and the laser housing portions.

It is a particularly preferred feature according to the present invention to provide the annulus with a cooling channel traversing both the circumference and the length of the annulus, such as in a spiral fashion, having ports at each end of the channel for circulation of water or other cooling fluid. This is a particular advantage of the present invention since prior insulators used between laser housing portions have been made of ceramic, which is not easily adaptable for providing a cooling channel and, over the lifetime of the laser, the ceramic may leak and/or crack, causing the the laser to fail. Furthermore, use of a metallic cooling channel imbedded in a ceramic insulator would possibly create another problem due to the differential in the expansion of metal and ceramic, which may cause the ceramic to crack.

The materials from which the insulator means according to the present invention is made will be heat-resistant resins, such as an epoxy resin, which are commercially available. These resins usually will be thermally stable at least up to about 180° C. Such resins include resins manufactured to United States government specifications G-11 and G-10. The aforementioned channel may be formed, for example, by joining two pieces of resinous material, one being a spirally grooved insert into the other, which is a tubular portion. The two portions may be securely attached by commercially available glues which are vacuum tight and heat-resistant up to the applicable temperatures.

Referring to FIG. 1, there is shown an insulator means comprising an annulus 10 which is securely attached, such as by epoxy glue, to a spirally grooved tubular portion 11. Tubular portion 11, when securely attached to the interior surface of annulus 10, forms a single spiral channel 12 running circumferentially and along the length of the entire insulator means. The outermost portion of channel 12 at each end of the annulus 10 communicates with a port 13 at each end for entry and exit of the cooling fluid. Annulus 10 and grooved portion 11 are both made of a high-temperature epoxy resin. At each end of annulus 10a partially circumferential groove 14 will be cut through to the solid resin block 10 whereby threaded inserts 15 may be imbedded and fixed in place by refilling groove 14 with fluid resin which is then allowed to set and harden. The portions 15 are adapted to accommodate an appropriate attachment means, such as a bolt or a screw, to attach the insulator means to the adjacent laser housing portion (not shown). The inserts 15 may be aligned prior to setting of the resin with the corresponding attachment means on the laser housing portion.

FIG. 2, a cross-section taken along line 2—2 of FIG. 1, and FIG. 3, an exploded perspective of FIG. 1, show in more detail the communication of the spiral groove 12 with each of the ports 13. Also shown is the shape of the groove 14 as being such that when the resin sets, because of the tapering depth of groove 14, withdrawal of the solid plug of resin in groove 14 is prevented when forces are applied due to tightening of bolts or screws into inserts 15.

It may therefore be seen that the insulator means according to the present invention may be cooled as well as also formed into virtually any size to accommodate a corresponding responding laser housing portion.

The foregoing description of the preferred embodiment of the invention is presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated and it is intended that the scope of the invention be defined by the claims appended hereto.

What is claimed is:

1. A thermally stable electrical insulator means formed of heat-resistant resin adapted for joining electrically conductive tubular members of a metal vapor laser, and insulator means comprising: an annular housing open at both ends; a channel within said housing traversing the circumference and length of said housing; at least two ports, each communicating with said channel and the outer surface of said housing; and attachment means for securely attaching each end of said insulator means to one of said tubular members.

2. An insulator means according to claim 1 wherein said channel spirally traverses said housing, said channel having one of said ports at each end of said housing.

3. An insulator means according to claim 1 wherein thermally stable at least up to about 180° C.

4. An insulator means according to claim 2 wherein said attachment means comprises a plurality of threaded inserts at each end of said housing, said inserts adapted to receive threaded bolt means for attachment of said housing to said tubular members.

5. An insulator means according to claim 2 wherein said attachment means comprises a plurality of threaded inserts at each end of said housing, said inserts adapted to receive threaded bolt means for attachment of said housing to said tubular members.

* * * * *